Patented Oct. 2, 1934

1,975,166

UNITED STATES PATENT OFFICE 1,975,166

AZO DYES AND METHOD FOR THEIR PREPARATION

Mordecai Mendoza, West Didsbury, and John Hannon, Gorton, England, assignors to Imperial Chemical Industries Limited, a corporation of Great Britain No Drawing. Application June 8, 1933, Serial No. 674,968. In Great Britain January 28, 1931

12 Claims. (Cl. 260—72)

This invention relates to new coloring materials and more particularly refers to new mixtures of dyes especially adapted for dyeing leather in uniform shades of excellent fastness. The instant application is a continuation in part of application Serial No. 583,140, filed December 24, 1931, which has issued as Patent No. 1,923,944.

In its general embodiment, this case comprises the subject matter of the parent case, but differs therefrom in that the end component, referred to therein as component B, is used in insufficient amounts to couple with all the disazo compound produced. In order to understand the invention somewhat more thoroughly the original case will be briefly reviewed:

The preferred embodiment of the parent case comprised a trisazo dye of the following general formula:

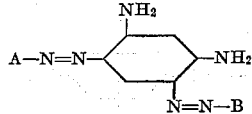

wherein A represents the residue of an aminoazo compound obtained by coupling a diazotized amino-benzene with a naphthylamine-sulfonic acid, and B represents the residue of an amino-benzene. The amino-benzene components may have substituted thereon sulfonic acid, halogen and/or nitro groups. The diamino-benzene component may have substituted thereon an alkoxy or halogen group. The napthylamine-sulfonic acid may have substituted thereon a hydroxy group. The aforementioned substituent group must not, however, prevent coupling from taking place.

The present invention in its preferred embodiment comprises coupling the disazo compound heretofore represented by the following portion of the aforementioned general formula:

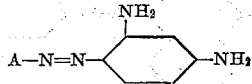

with less than an equivalent amount of an amino-benzene-sulfonic acid. Especially satisfactory results are, in general, obtained by reacting one molecule of the disazo compound with about one-half molecule of the diazotized amino-benzene-sulfonic acid. It is to be understood that the numerous components which fall within the scope of the parent case may likewise be used herein, although optimum results are apparently obtained when the second component is 1:6- or 1:7-Cleve's acid or a technical mixture of the two.

The invention may be somewhat more fully understood by a consideration of the following illustrative example, in which the quantities are stated in parts by weight:

Example 9.3 parts of aniline are diazotized in the customary manner and the resulting diazo solution is added with stirring below 10° C. to a solution of 22.3 parts of the technical mixture of Cleve's 1:6- and 1:7- acids in 300 parts of water and 5.3 parts of calcined sodium carbonate containing 21 parts of sodium acetate crystals. Coupling proceeds with the formation of a dark brown compound and is complete in about one hour. Sufficient caustic soda lye (33%) is then added to make the coupling mixture faintly alkaline to litmus, a bright yellowish orange suspension being obtained. 100 parts of salt are then stirred in and 35 parts of oil of vitriol diluted with an equal amount of ice are added quickly followed by 9.7 parts of sodium nitrite in 10% solution. Rediazotization is effected by stirring the mixture for one hour at 10° C. and then allowing it to stand for a further 12 hours at this temperature. The light reddish brown diazo compound is filtered off and pressed and is then stirred with 200 parts of water and ice (in about equal parts). The suspension is then mixed with 10.8 parts of m-phenylene-diamine, dissolved in 200 parts of water.

This disazo compound is then reacted with one-half the amount of diazotized sulfanilic acid necessary to complete coupling therewith. When combination is complete the mixture of dyestuffs, which is presumed to be formed is isolated as explained in Example 1 of the parent case.

The mixture of dyes so obtained dyes vegetable tanned or chromed leather in brown shades which possess superior fastness to light and washing.

It is to be understood that the amount of end component used may be varied within rather wide limits without departing from the scope of the present invention. This amount must be less than the amount necessary to couple with all the disazo compound formed. However, it need not be one-half, but may be considerably greater or smaller than this preferred proportion.

It is likewise to be understood that the aminoazo compound, heretofore referred to as A, may be coupled with the diamino-benzene after this latter compound has been coupled with the diazotized amino-benzene-sulfonic acid. The directions herein given are, on the whole, concerned with the coupling of the disazo compound with diazotized amino-benzene-sulfonic acid. Nevertheless, it is well known to one skilled in the art, and is intended herein, that these directions may be reversed and the diazotized amino-benzene-sulfonic acid first coupled with the diamino-benzene, and this monoazo compound then coupled with the diazotized monoazo amino compound. Wherever in the present specification and claims reference has been made to the coupling of the diazotized monoaminoazo compound with the meta-phenylene-diamine, and the coupling of the resulting disazo compound with the diazotized amino-benzene-sulfonic acid, it is to be understood that this order may be reversed without impairing the advantageous results attained herein.

Due to the similarity of this application and the parent case only one example has been given herein for purposes of illustration. However this was the result of a desire for brevity rather than due to any limitation on the scope hereof, and it is to be understood that these directions apply to all the examples of the parent case, as well as to the various other compounds included within the scope hereof.

The coloring material obtained in accordance with the instant application is presumably a mixture of a trisazo dye of the constitution disclosed in the parent case and a disazo dye having a similar constitution with the exception that the component represented by B, and the connecting azo group, is eliminated. These two classes of dyes are so closely related in shade that the usual disadvantages inherent in the dyeing of material by a mixture of colors do not apply. A coloring material consisting wholly of a disazo dye of the aforementioned constitution would not be well suited for dyeing leather because of its poor solubility and lack of penetrating and leveling power, however, this compound when in combination with the trisazo dyes referred to in the parent case produces very satisfactory colors having exceptional leveling and penetrating properties.

As many apparently widely different embodiments of this invention may be made without departing from the spirit and scope thereof, it is to be understood that we do not limit ourselves to the specific embodiments thereof except as defined in the appended claims.

We claim:

1. A process for producing a mixture of azo dyes which comprises coupling a diazotized amino-benzene with a naphthylamine-sulfonic acid, diazotizing the resulting aminoazo compound and coupling it with a diamino-benzene, and coupling part of the resulting disazo compound with a diazotized amino-benzene.

2. A process for producing a mixture of azo dyes which comprises coupling a diazotized amino-benzene which may have substituted thereon members selected from the group consisting of sulfonic acid, halogen and nitro, with a naphthylamine-sulfonic acid, diazotizing the resulting aminoazo compound and coupling it with meta-phenylene diamine which may have substituted thereon a member selected from the group consisting of alkoxy and halogen, and coupling part of the resulting disazo compound with a diazotized amino-benzene which may have substituted thereon members selected from the group consisting of sulfonic acid, halogen and nitro.

3. A process for producing a mixture of azo dyes which comprises coupling a diazotized amino-benzene with Cleve's acids, diazotizing the resulting aminoazo compound and coupling it with meta-phenylene-diamine, and coupling part of the resulting disazo compound with a diazotized amino-benzene.

4. The process of claim 3 wherein part of the resulting disazo compound is coupled with a diazotized amino-benzene-sulfonic acid.

5. A process for producing a mixture of azo dyes which comprises coupling diazotized aniline with a technical mixture of Cleve's acids, diazotizing the resulting aminoazo compound and coupling it with meta-phenylene-diamine, and coupling part of the resulting disazo compound with diazotized sulfanilic acid.

6. A process for producing a mixture of azo dyes which comprises coupling diazotized aniline with a technical mixture of Cleve's acids, diazotizing the resulting aminoazo compound and coupling it with meta-phenylene-diamine, and coupling about half of the resulting disazo compound with diazotized sulfanilic acid.

7. A mixture of azo dyes having the following general formulas:

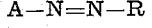
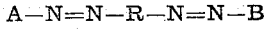

wherein A represents the residue of an aminoazo compound, produced by coupling a diazotized amino-benzene with a naphthylamine-sulfonic acid; R represents a diamino-benzene nucleus; and B represents the residue of an amino-benzene.

8. A mixture of azo dyes having the following general formulas:

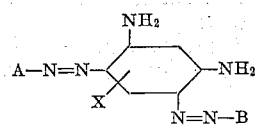
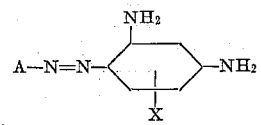

wherein A represents the residue of an aminoazo compound, produced by coupling a diazotized amino-benzene which may have substituted thereon members selected from the group consisting of sulfonic acid, halogen and nitro, with a naphthylamine-sulfonic acid; B represents the residue of an amino-benzene, which may have substituted thereon members selected from the group consisting of sulfonic acid, halogen and nitro; and X represents hydrogen or an alkoxy, or halogen group.

9. A mixture of azo dyes having the following general formulas:

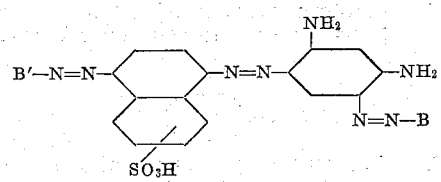
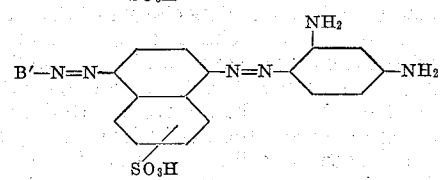

wherein B and B' represent amino-benzene residues.

10. The product of claim 9 wherein the component represented by B is the residue of an amino-benzene-sulfonic acid.

11. A mixture of azo dyes having the following formulas:

[Structural formulas of two azo dyes]

12. The mixture described in claim 11 wherein the dyes comprised therein are present in about equal molecular proportion.

MORDECAI MENDOZA.
JOHN HANNON.

Certificate of Correction

Patent No. 1,975,166. October 2, 1934.

MORDECAI MENDOZA ET AL.

It is hereby certified that errors appear in the printed specification of the above numbered patent requiring correction as follows: Page 2, line 24, for "hereof" read *thereof*; and page 3, lines 14 and 21, in the formulas of claim 11, for "$SO_3$ H" read $SO_3H$ and that the said Letters Patent should be read with these corrections therein that the same may conform to the record of the case in the Patent Office.

Signed and sealed this 13th day of November, A. D. 1934.

[SEAL]

LESLIE FRAZER,
*Acting Commissioner of Patents.*